United States Patent [15] 3,700,216
Uitti et al. [45] Oct. 24, 1972

[54] VAPOR-LIQUID CONTACTING DEVICE

[72] Inventors: Kenneth D. Uitti, Bensenville; Don B. Carson, Mt. Prospect, both of Ill.

[73] Assignee: Universal Oil Products Company, Des Plaines, Ill.

[22] Filed: Dec. 21, 1970

[21] Appl. No.: 99,860

[52] U.S. Cl. ............................................. 261/114 R
[51] Int. Cl. ................................................ B01f 3/04
[58] Field of Search ..................... 261/114 R, 114 VT

[56] References Cited

UNITED STATES PATENTS

| | | |
|---|---|---|
| 2,880,980 | 4/1959 | Bowles .................. 261/114 R |
| 3,125,614 | 3/1964 | Mayfield et al. ........ 261/114 R |
| 3,282,576 | 11/1966 | Bruckert et al. ........ 261/114 R |
| 3,417,975 | 12/1968 | Williams et al. ........ 261/114 R |

Primary Examiner—Tim R. Miles
Attorney—James R. Hoatson, Jr. and Edward W. Remus

[57] ABSTRACT

In a vapor-liquid contacting column having a plurality of vertically spaced contacting trays, vapor-liquid contacting on these trays is improved by the installation of:

1. an inwardly slanted imperforate wall adjacent to the imperforate liquid inlet portion of the tray so as to separate the liquid inlet section from the perforate contacting section, and
2. a vertical imperforate wall at a height below the upper edge of the slanted wall.

These walls are constructed to form a continuous vapor slot opening across the column which communicates with a lower tray whereby rising vapor is directed against the liquid overflowing the slanted wall to produce a vapor-liquid mixture of uniform composition with a uniform liquid velocity as well as a uniform concentration front.

8 Claims, 3 Drawing Figures

PATENTED OCT 24 1972 3,700,216

INVENTORS:
Kenneth D. Uitti
Don B. Carson

BY: James R. Hoatson, Jr.
Edward W. Remus
ATTORNEYS

VAPOR-LIQUID CONTACTING DEVICE

BACKGROUND OF THE INVENTION

The present invention pertains to an improved vapor-liquid contacting tray device. More particularly, the present invention pertains to an improved tray device for producing a vapor-liquid mixture of uniform composition with a uniform liquid velocity across the column. More specifically, the present invention pertains to a vapor-liquid contacting tray employing a wet baffle overflow means intermediate to the liquid inlet portion and the vapor-liquid perforate contacting portion of the tray.

It is well known to those trained in the art of separation involving liquid-vapor contacting, that the efficiency of mass transfer between two phases is directly related to the degree of mixing obtained between the phases. For example, in a fractionation column, efficient separation of components of differing boiling points is accomplished by the intimate, repetitive contact between a rising vapor and a falling liquid on a series of vertically spaced transverse trays. When insufficient contact between the vapor and liquid is obtained, the fractionation column will operate inefficiently (i.e., poor separations result). This high degree of contact is necessary to establish phase equilibrium with no gradient in composition transverse to the liquid flow at as many points on the tray as possible.

As the diameter of a fractionation column increases, it becomes more and more difficult to obtain a uniform degree of contact across the whole column area. This is the result of there being a much higher liquid velocity across the tray through the center, compared to the perimeter. This is particularly true in large diameter, low pressure fractionation columns wherein a very low pressure drop per tray is available for vapor-liquid mixing and transverse distribution such as in ethylbenzene-styrene separation. In some current, large diameter columns, because of the distance between the liquid inlet and liquid outlet points of a tray, a large liquid head must be present at the liquid inlet portion of a given tray to initiate flow across the tray to the liquid outlet. This large liquid head at one end of the tray produces imperfect contacting on the tray, taken as a whole, since the uprising vapors, in taking the path of least resistance, tend to bypass the areas of large liquid head. Further, in these areas of large liquid head, the accumulated liquid often bypasses the entire tray by weeping through the vapor openings and draining on the tray below. Thus, not only is the vapor rising from the tray below not uniformly distributed across the tray above, but the liquid on the above trays often bypass the tray, at least in part, and falls on the trays below without ever being contacted to any degree with the vapor from the tray below. Further, in some instances not only does the liquid which weeps fail to contact vapor from the lower tray in question, but also this same portion of weeping liquid bypasses the next lower tray in entirety.

The art has attempted to solve some of these contacting problems by using varying tray designs or the installation of certain devices in the area of the liquid entry on the tray to promote bubble formation (i.e., a uniform vapor-liquid mixture) prior to the entry of the liquid onto the contacting portion of the tray. This result is desired since it is known that once vapor is caused to flow through a liquid immediately upon its entering a tray, the mixed fluids, upon flowing across the tray, will induce conditions favorable to bubbling and efficient contact throughout the tray without weeping on the liquid inlet side. An example of such a tray is the bubble promoter of U.S. Pat. No. 3,282,576 (also described in Chemical Engineering Progress, Vol. 65, No. 2, page 79 February 1969)). This (February art promoter utilizes an imperforate, inwardly sloped wall contiguously associated with an outwardly sloped perforated wall. The perforations are about 14 percent of the perforated wall area. The liquid flows from the liquid inlet portion up and over the imperforate wall onto the sloped perforate wall where, since the liquid head there is less than it is on the tray, vapor readily passes through the perforations and aerates or bubbles the liquid. However, this device, because of its sloped orientation and small perforated area (i.e., 14 percent) has a tendency to allow some liquid to pass down its slope and drain through the first row or segment of openings in the vapor-liquid contact region and drain on the tray below.

An additional problem encountered in the art is the establishment of a uniform liquid velocity across the vapor-liquid contacting tray, i.e., the liquid proceeds across the tray at the same velocity at every point on the tray. This is important, since a given average liquid velocity across a tray with large velocity differences on the tray will typically produce results inferior to those obtained where the liquid velocity at each point in the tray is substantially the same as the average liquid velocity across the tray.

SUMMARY OF THE INVENTION

Accordingly, it is an object of the present invention to provide a means for inducing a uniform vapor-liquid distribution across the vapor-liquid contacting portion of a contacting tray.

It is another object of this invention to provide a means for establishing a uniform liquid velocity across the vapor-liquid contacting portion of a contacting tray.

It is a still further object of this invention to provide a means for eliminating liquid weepage from one tray to a lower tray prior to the liquid contacting the vapor arising from the lower tray. It is by accomplishing these objectives that a more efficient vapor-liquid contacting is effected, particularly when the device of the present invention is utilized in fractional distillation columns.

In a broad embodiment, the present invention provides an improvement in a vapor-liquid contacting column having a plurality of vertically spaced, transverse trays for contacting a vapor and a liquid, at least one of such trays having a substantially imperforate liquid inlet portion, a liquid outlet portion, a perforate vapor-liquid contacting portion within the liquid flow portion and intermediate to the liquid inlet and liquid outlet portions, and a downcomer for conducting liquid from the liquid outlet portion of one tray to the liquid inlet portion of another tray. This improvement comprises a first, inwardly slanted substantially imperforate wall having an upper edge and a lower edge. The lower edge of this slanted wall is contiguously associated with the liquid inlet portion of the tray and separates the imperforate liquid inlet portion of the tray from the perforate section of the tray. Preferably, this first slanted wall forms an angle of from about 10° to about 45° with the tray surface. In addition, this wall may also extend over a portion of the perforate, vapor-liquid contacting portion of the tray. This plate causes the liquid descending from the tray above, down the downcomer, to be directed over this slanted wall. Further, a second, upwardly extending, substantially imperforate wall having an upper edge and a lower edge has its lower edge contiguously associated with the vapor-liquid contacting portion of the tray. This second wall is constructed to extend substantially vertically upward and terminates at a height below that of the upper edge of the first slanted wall so as to form a substantially continuous vapor slot extending across the column communicating with a lower tray. Preferably, this vertical wall is positioned essentially immediately below the upper edge of the slanted wall. This slot directs at least a portion of the vapor arising from a lower tray against the liquid passing over the first slanted wall to provide a vapor-liquid mixture of uniform composition with a uniform liquid velocity prior to further vapor-liquid contacting over the perforate portion of the plate. It is preferred, in more limited embodiments of this invention to have a vapor slot opening which comprises about 15 percent to about 75 percent of the total area defined by the lower edge of the second wall and the upper edge of the slanted wall. This tray improvement device, which is particularly suited to float-valve type trays or sieve type trays, may be installed as an addition to an existing tray or it may be incorporated directly into the original manufacture of the tray.

Reference to the attached drawing and the following detailed description thereof will fully illustrate the design and construction of the device of the present invention along with its advantageous features and benefits.

DESCRIPTION OF THE DRAWING

Referring to FIGS. 1 and 2, there is shown a conventional single pass fractionating column 1 having a plurality of perforated contacting plates or trays 2a, 2b and 2c arranged therein, one over the other. These trays are attached to fractionating column 1 by conventional means not shown. While the tray, as illustrated, shows perforated, sieve-type openings, such illustrated openings are not necessarily critical to the practice of the present invention. Hence, bubble cap means and float-valve means are all included within the generally broad scope of the present invention with sieve-type trays and float-valve trays being particularly preferred. As illustrated, each tray (2a, 2b and 2c) has an imperforate liquid inlet surface 3 forming part of the perimeter of the tray onto which the liquid from an upper tray enters. The geometrical configuration and design of this liquid inlet surface shown is illustrative of a typical single pass fractionating tray; however, the particular shape of this inlet surface is not to be deemed as limiting upon the present improvement invention.

Figure 2:
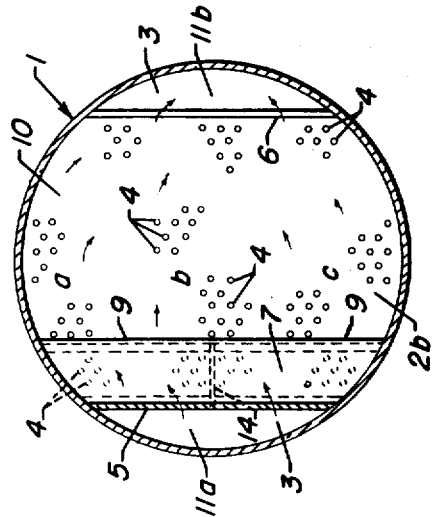
FIG. 2 is a cross-sectional view of the embodiment illustrated in FIG. 1 taken through Section line 2—2.

Each tray has a perforated portion 10, having disposed therein perforations 4. Portion 10 extends inwardly from the imperforate inlet surface 3 transversely across part of the column and terminates at liquid discharge opening 11a, 11b and 11c. Perforate portion 10 permits vapor to pass through perforations 4 as the vapor rises from a lower tray to the bottom side of a given tray.

Also included in the internal construction of the column is a downcomer member 5 associated with each tray and which is spaced from column wall 12 in a position substantially parallel to the longitudinal axis of the column. If desired, however, this downcomer may be inclined away from the tray and toward column wall 12 in a manner known to the art. Further, downcomer 5 is spaced above and is coextensive with the inlet imperforate surface 3. To help maintain a predetermined hydrostatic head or liquid seal on tray 2a, 2b or 2c, a weir or other form of obstruction 6 may be associated with the downcomer. This conventional downcomer arrangement serves to transfer liquid from an upper tray to a lower tray and establishes liquid flow along the column walls onto liquid inlet portion 3, beneath the lower end of downcomer 5 and onto the contacting portion of the lower tray, as shown by the flow arrows in FIGS. 1 and 2.

Associated with each contacting tray is an inwardly slanted, substantially imperforate wall 7. The lower edge of this wall 7 is contiguously associated with the liquid inlet portion 3 so as to separate the imperforate liquid inlet portion 3 from the perforated portion 10 of the tray. If desired, at least a portion of this slanted wall 7 may extend over at least a portion of the vapor-liquid contacting portion 4 of the tray. Slanted wall 7 is preferably imperforate although it is contemplated that a certain minor amount of free area be provided so that some liquid and/or vapor may pass therethrough. Preferably, all of the liquid flowing onto the tray via liquid opening 11a, 11b or 11c is directed over wall 7.

Contiguously associated with vapor-liquid contacting section 4 is an upwardly extending, substantially imperforate wall 8. Preferably, this wall extends across the entire tray from one side of the column to the other side. This wall 8 is constructed substantially vertically upward and terminates at a height below that of the upper edge of slanted wall member 7. This vertical configuration insures a turbulent flow pattern adjacent to the wall so that no liquid weepage occurs in the perforated area immediately adjacent to wall 8. Further, the wall prevents any liquid weepage under wall 7 into vapor space 13. Illustrated is the preferred configuration between slanted wall 7 and vertical wall 8 wherein the upper edge of slanted wall 7 terminates spatially immediately above vertical wall 8. Slanted wall 7 and vertical wall 8 form a substantially continuous vapor slot 9 extending across the column and which communicates with vapor space 13 of a lower tray by perforations 4. As the vapors rise through perforations 4, they pass out through vapor slot 9 and impinge on the liquid flowing over slanted wall 7. This vapor-liquid contacting, prior to further vapor-liquid contacting over perforate portion 10, promotes a vapor-liquid mixture of relatively uniform composition between the vapor passing through slot 9 and the liquid passing over wall 7 which leads to favorable conditions for frothing on the perforate portion 10 of the tray. Further, this contacting establishes a uniform liquid velocity which continues as the liquid flows across the perforate tray portion 10. In other words, referring to FIG. 2, the liquid flowing across the perforate portion 10 has relatively the same velocity at points $a$, $b$ and $c$. It is by establishing this initial uniform velocity in combination with an initial vapor-liquid mixture of uniform concentration that efficient fractionation approaching ideality is obtained with no liquid weeping onto the trays below. This elimination of liquid weeping is particularly important since often much of the liquid which weeps through a given tray not only bypasses that tray but also bypasses the next lower tray. This can be illustrated by referring to FIG. 1. Without the installation of slanted wall 7 and vertical wall 8 a portion of the liquid descending through liquid opening 11a would bypass tray 2b through openings 4 and fall into liquid opening 11c below, thus avoiding the necessary contact with uprising vapors on not only tray 2b but also 2c, thus bypassing not only one but two trays. As illustrated, vapor slot opening 9 is parallel to the surface of tray 2b wherein the upper edge of the slanted wall is also parallel to tray 2b. The exact width of slot 9 is a function often of the particular type of vapor-liquid contacting being performed and the components involved; however, it is preferred that the slot comprise about 15 percent to about 75 percent of the area defined by the lower edge of vertical wall 8 and the upper edge of slanted wall 7.

Figure 3:
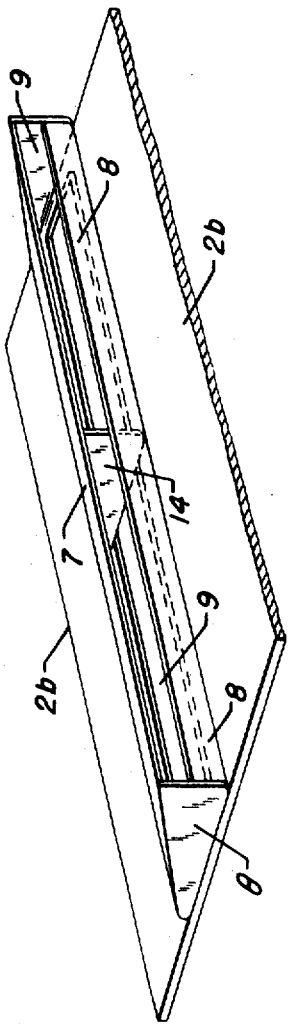
FIG. 3 is an isometric view of the continuous slot improvement device embodied in this invention.

FIG. 3 is an isometric view of the improvement device of the present invention showing the orientation of sloped wall 7 as it relates to vertical wall 8 to form continuous slot 9. Support means 14 is present, not for any vapor-liquid property enhancement, but solely to lend support to the intermediate portions of sloped wall 7 and to insure a slot opening of uniform width across the entire column. Further, it is preferred that the angle $\theta$ between sloped wall 7 and tray 2b be about 10° to about 45°.

A particularly advantageous feature of the device of the present invention is its ability to be readily installed in existing columns. In other words, members 7, 8 and 14 can be constructed and assembled apart from the tray 2a, 2b or 2c itself. Thus, the device is readily installed on existing fractionation trays and the like where there is improper vapor-liquid distribution and unequal liquid velocities across the tray.

It is to be remembered that the drawings presented are schematical in nature and are not to be considered as limiting upon the design of a contact tray. For example, for simplicity, the contact area is shown as a sieve-type plate (instead of, say, a valve-type tray) and the exact physical dimensions will depend on the physical properties of the vapors and liquids utilized and the particular environment of the column. However, the improvement device of the present invention finds particularly beneficial results when utilized in distillation columns operating at subatmospheric pressures since it provides a vapor-liquid mixture of uniform composition and a uniform liquid velocity on each tray with an extremely low pressure drop per theoretical tray. This is particularly important wherein the distillation column processes a feed containing a thermally unstable constituent. For example, in the separation of ethylbenzene and styrene, a low overall pressure and attendant low pressure differential per tray is necessary to prevent styrene polymerization in the reboiler. Further the present device provides a uniform vapor-liquid mixture without entraining any liquid in the uprising vapor so that the liquid never bypasses the tray to which it is fed.

To further illustrate the benefits obtainable by utilizing the device of the present invention, the following example is presented. This example, however, is not presented for purpose of limiting the scope of the invention but is presented solely to illustrate the benefits to be derived by its utilization.

EXAMPLE

Figure 1:
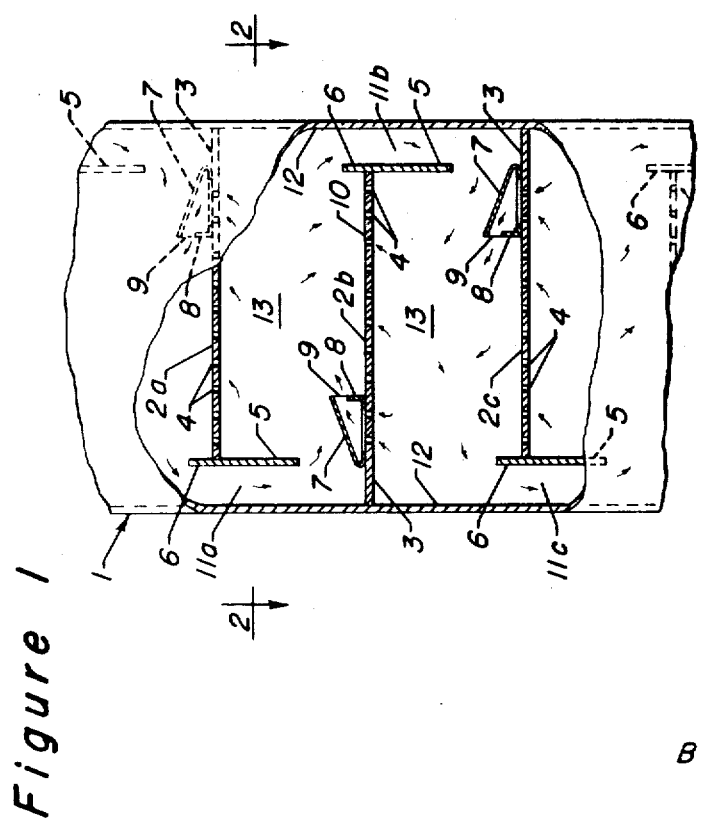
FIG. 1 is a partial elevational view, shown in section, of a single pass vapor-liquid contacting column (i.e., fractional distillation column) utilizing the improved contact tray member of the present invention.

The data presented below were obtained under commercial operating conditions wherein an ethylbenzene-styrene mixture containing 41 percent (mole) ethylbenzene and 59 percent styrene with a trace of other aromatics, etc., was fractionated in a 20 foot 0 inch diameter double-pass fractionating column containing 85 trays at a 24 inch tray spacing. Each tray contained 40 feet$^2$ (12.7 percent) of free area in the form of Koch Flexitray Valves installed in 1½ inch diameter openings. The column was maintained at a top pressure and temperature of 35 mm Hg (absolute) and 125° F and at a bottom pressure and temperature of 250 mm Hg (absolute) and 225° F. The fresh feed to the column was maintained at 18.1 kiloliters per hour with an overhead make of 8.1 kiloliters per hour and a bottom make of 10.0 kiloliters per hour. A reflux of 69.5 kiloliters per hr, corresponding to a reflux to feed ratio of 3.76 (mole) was utilized. The initial operation of the column was performed without the benefit of the improvement device of the present invention. After the initial results proved unsatisfactory, the device of the present invention, and as illustrated in FIGS. 1, 2 and 3, was installed. This device was installed by first removing the valves and valve cages from the first row of valves parallel to the imperforate liquid inlet portion of each plate and installing the present device over the resulting row of free 1½ inch holes. As indicated, the device was installed in relation to the liquid inlet region as illustrated in FIGS. 1 and 2, and extended entirely across the column. More particularly, referring to FIG. 3, vertical wall 8 was one half inch high, slanted wall 7 was 2 ⅝ inch wide and walls 7 and 8 were oriented with the upper edge of wall 7 immediately above wall 8 to provide a continuous one half inch vapor slot (i. e., angle $\theta$ was about 17.5°). Communication to lower trays was provided by the holes beneath wall 7 resulting from the removal of the first row of tray-valves. Tabulated below are the average results obtained both before and after the installation of the device of the present invention. Compositions are in mole percent. The tray efficiency presented represents an overall column efficiency as determined by the operating conditions utilized and the Murphee efficiency.

|  | Before | After |
| --- | --- | --- |
| Overhead Composition |  |  |
| Styrene | 6% | 2% |
| Ethylbenzene | 94% | 98% |
| Bottoms Composition |  |  |

| | | |
|---|---|---|
| Styrene | 99.8–99.9 | 99.99 |
| Ethylbenzene | 0.1–0.2 | 0.01 |
| Tray Efficiency | 40–50% | 80–90% |

From the foregoing results, the beneficial import of the present device is obvious to one trained in the art. By increasing the overall efficiency of the column, by a factor of two or more, solely by the installation of the present device, (i.e., all other operating conditions were kept constant), the number of theoretical trays is more than doubled and the pressure drop per theoretical tray is halved. Thus, a greatly improved distillation column operation is obtained by the installation of a relatively inexpensive device, heretofore unrecognized by the art.

We claim as our invention:

1. In a vapor-liquid contacting column having a plurality of vertically spaced, transverse trays for contacting a vapor and liquid, at least one of such trays having a substantially imperforate liquid inlet portion, a liquid outlet portion, a perforate vapor-liquid contacting portion within the liquid flow pattern and intermediate to the liquid inlet and liquid outlet portions, and a downcomer for conducting liquid from the liquid outlet portion of one tray to the liquid inlet portion of another tray the improved tray construction which comprises a first, inwardly slanted, substantially imperforate wall having an upper edge and a lower edge, said lower edge of said slanted wall contiguously associated with the liquid inlet portion of the tray, said slanted wall separating the imperforate liquid inlet section of the tray from the perforate section of the tray whereby liquid is directed over said wall, and a second, upwardly extending substantially imperforate wall having an upper edge and a lower edge, said lower edge of said second wall contiguously associated with the vapor-liquid contacting portion of the tray and constructed to extend substantially vertically upward and terminate at a height below that of the upper edge of said slanted wall to form a substantially continuous vapor slot extending across the column and communicating with a lower tray whereby at least a portion of the vapor is directed against the liquid passing over said slanted wall to provide a vapor-liquid mixture of uniform composition with a uniform liquid velocity prior to further vapor-liquid contacting over the perforate portion of the tray.

2. The improvement of claim 1 wherein said second vertical wall is positioned essentially immediately below the upper edge of said slanted wall.

3. The improvement of claim 1 wherein said first slanted wall forms an angle with said tray of about 10° to about 45°.

4. The improvement of claim 1 wherein said vapor slot opening comprises about 15 percent to about 75 percent of the total area defined by the lower edge of said second wall and the upper edge of said slanted wall.

5. The improvement of claim 1 wherein said perforate vapor-liquid contacting portion of said tray comprises a sieve-type tray structure.

6. The improvement of claim 1 wherein said perforate-vapor-liquid contacting portion of said tray comprises a float-valve-type tray structure.

7. The improvement of claim 1 wherein said first slanted wall extends over a portion of the perforate, contacting portion of said tray.

8. The improvement of claim 1 wherein said upper edge of said second wall is parallel to the tray.

* * * * *